United States Patent [19]

Lamanna et al.

[11] 3,903,051
[45] Sept. 2, 1975

[54] WATER-SOLUBLE ACIDIC POLYESTERS AND THERMOSETTING WATER-BASED COATINGS CONTAINING THEM

[75] Inventors: Richard A. Lamanna, Jefferson Borough; Dwight L. Stephens, Ross Township, both of Pa.

[73] Assignee: Mobil Oil Corporation, New York, N.Y.

[22] Filed: Feb. 15, 1974

[21] Appl. No.: 442,945

[52] U.S. Cl. ..... 260/75 R; 117/155 L; 260/29.2 EP; 260/29.4 R; 260/75 EP; 260/78.4 EP
[51] Int. Cl.² ......................................... C08G 63/12
[58] Field of Search .... 260/75 R, 29.2 EP, 78.4 EP, 260/75 EP

[56] References Cited
UNITED STATES PATENTS
3,287,319   11/1966   Lerer .............................. 260/75 R FOREIGN PATENTS OR APPLICATIONS
804,256   11/1958   United Kingdom OTHER PUBLICATIONS
Schmadel, et al., Chemical Abstracts, Vol. 71: 126,335x (1969).

Schmadel, et al., Chemical Abstracts, Vol. 70: 107,727g (1969).

Jarusek, et al., Chemical Abstracts, Vol. 66: 56,078m (1967).

*Primary Examiner*—Melvin Goldstein
*Assistant Examiner*—W. C. Danison
*Attorney, Agent, or Firm*—Charles A. Huggett; Hastings S. Trigg

[57] ABSTRACT

Water-soluble acidic polyesters are prepared by reacting a hydroxy polycarboxylic acid, such as citric acid, with an alkylene oxide, such as propylene oxide, an alkylene glycol, or styrene oxide and a polyesterifying to an acid number of about theoretical to about 25% above theoretical. A thermosetting coating comprises the acidic polyester and a conventional aminoplast in an aqueous vehicle. When the coating is applied to a substrate, such as label stock, and is thermoset, a durable high gloss varnish is produced.

6 Claims, No Drawings

WATER-SOLUBLE ACIDIC POLYESTERS AND THERMOSETTING WATER-BASED COATINGS CONTAINING THEM

BACKGROUND OF THE INVENTION

1. Field of the Invention

This invention is concerned with novel acidic polyesters and with water-based coatings containing them and an aminoplast.

2. Description of the Prior Art

In U.S. Pat. No. 3,046,252 there is described a polyester having a relatively low acid number and hydroxyl number, which is produced by the condensation reaction of benzene tricarboxylic acids with an alkylene oxide or an alkylene glycol. Coatings are formed with these polyesters and an aminoplast in vehicles conventionally used for alkyd resins, such as aromatic hydrocarbons. If a water-soluble baking resin is desired, these polyesters must be converted to salts by reaction with an alkaline agent.

The acidic polyester resins of the present invention of relatively high acid numbers and hydroxyl numbers are readily soluble in aqueous vehicles without resort to salt-forming. Insofar as is now known, acid polyester resins of this type have not been described heretofore.

SUMMARY OF THE INVENTION

This invention provides an acidic polyester produced by polyesterifying an aliphatic hydroxy polycarboxylic acid and a lower alkylene oxide, alkylene glycol or styrene oxide, using a ratio of hydroxyl (oxide) equivalents to carboxyl equivalents of 5:3 to 2:3, preferably 4:3, at a temperature between about 65°C. and about 150°C. and in the presence of an alkaline catalyst, until the acid number is at least about theoretical to about 25% above theoretical.

The invention also provides a thermosetting coating comprising said acidic polyester and an aminoplast in an aqueous vehicle; and baked coatings obtained therefrom.

DESCRIPTION OF SPECIFIC EMBODIMENTS

The acid component used in the acidic polyesters of this invention is hydroxy polycarboxylic acid. Although citric acid is preferred and used primarily to demonstrate the invention, other hydroxy polycarboxylic acids are contemplated such as tartaric acid, malic acid, and $\alpha, \beta$ -dihydroxytricarballylic acid.

The preferred alkylene oxide, which is used mostly for illustration herein, is propylene oxide. It is contemplated that alkylene oxides, alkylene glycols, or styrene oxide can be used, however. The alkylene oxides contain from 2 to 4 carbon atoms. These oxides are ethylene oxide, propylene oxide, and butylene oxide. The alkylene glycols contain from 2 to 6 carbon atoms and can be simple glycols or ether glycols. These glycols include ethylene glycol, propylene glycol, 1,4-butanediol, 1,3-hexanediol, diethylene glycol, dipropylene glycol, and triethylene glycol.

The hydroxy polycarboxylic acid and the alkylene oxide, alkylene glycol, or styrene oxide are reacted in amounts less than the stoichiometric amount needed for full esterification of all the carboxylic groups. In general, the ratio of hydroxyl (oxide) equivalents to carboxyl equivalents will be 5:3 to 2:3 and preferably 4:3. Generally, in practice, however, a slight molar excess of oxide or glycol is used, usually an excess of about 0.05 to 0.5 mole. In some cases, slightly less than the amount to esterify all but one carboxyl group may be used.

The polyesterification reaction is carried out in the presence of an alkaline catalyst. As catalysts there may be employed inorganic or organic bases such as alkali metal hydroxide, calcium oxide, sodium amide; alkyl and phenyl ammonium hydroxide, such as trimethylamine hydroxide; secondary amines, such as diethylamine, dibutylamine, piperidine; and tertiary amines such as trimethylamine, triethanolamine and pyridine. Catalytic amounts are used, usually about 0.1% to about 5% based on the weight of acid charged. In general, the addition and polyesterification reaction is carried out at temperatures between about 65°C. and about 150°C. In practice using an alkylene oxide or styrene oxide, its addition to the hydroxy polycarboxylic acid is carried out in the lower range of temperature, in the order of about 65°–90°C. The polyesterification is carried out in the higher portion of the range, in the order of about 110°–150°C. The time for the addition and polyesterification reaction will, of course, depend upon the temperature used and is generally between about 3 hours and about 10 hours. The polyesterification is complete when the reaction product attains an acid number of about theoretical to about 25% above theoretical. In the preferred case of propylene oxide and citric acid the acid number will be about 180–225.

After the desired acid number is attained, the reaction mixture is subjected to distillation under reduced pressure to remove low molecular weight polymer. This distillation is generally carried out at a temperature of between about 210°F., (99°C.) and about 302°F. (150°C.) under a vacuum of about 20 to about 30 inches of mercury.

The resultant acidic polyester is a water soluble material which is dissolved in water to form a clear solution at between about 70% and about 80% solids.

COATING COMPOSITIONS

The acidic polyester can be thermoset using a conventional aminoplast cross-linking agent. Such agents are well known in the art. There can be used any of the thermosetting alkylated aminoplast resins, such as the urea-aldehyde resins, the melamine aldehyde resins, the dicyandiamidealdehyde resins and other aminoplast-aldehyde resins such as those triazine resins produced by the reaction of an aldehyde with formoguanamine, ammeline, 2-chloro-4,6-diamino-1,3,5-triazine, 2 - phenyl-p-oxy-4,6-diamino-1,3,5-triazine, 6 -methyl-2,4-diamino-1,3,5-triazine; 2,4,6- trihydrazine-1,3,5-triazine, and 2,4,6 - triethyl - triamino-1,3,5-triazine. The mono-, di-, or triaralkyl or mono-, di, or tri-aryl melamines, for instance 2,4,6-triphenyltriamino-1,3,5-triazine are preferred. As aldehydes used to react with the amino compound to form the resinous material, one may use such aldehydes as formaldehyde, acetaldehyde, crotonic aldehyde, acrolein, or compounds which engender aldehydes, such as hexamethylenetetramine, paraldehyde, paraformaldehyde, and the like.

It is preferred to use an aminoplast that is water soluble. In general, an alcohol, such as isopropanol or ethanol is added to a solution of aminoplast in water.

Other well known adjuvants may be added, such as flow control agents and waxes. A preferred flow control agent is sodium dioctyl sulfosuccinate, but others utilizable include sodium dihexyl sulfosuccinate, sodium diamyl sulfosuccinate, isopropyl naphthalene sulfosuccinate, and sorbitan monolaurate, monopalmitate, or monoleate. Waxes, if used, are added as slurries or emulsions of petroleum (paraffin) wax, natural waxes such as montan wax, beeswax, and carnauba wax, or synthetic waxes such as polyethylene wax.

To prepare the final coating composition the acidic polyester solution is admixed with the aminoplast mixture. These components will usually be blended using between about 60 and about 70 parts by weight of acidic polyester solution to between about 40 and about 30 parts by weight aminoplast mixture. Other ratios can be used, bearing in mind, however, that higher aminoplast concentrations tend to increase brittleness of the final baked finish and that lower aminoplast concentrations tend to increase bake temperature or bake time, or both. The final product should have a solids content of between about 60 and about 80 wt.%.

These coating compositions can be applied to the desired substrate as such or, in some case, it may be diluted as, for example, about 20/1 with isopropanol or water. After application the coating is baked at about 3 seconds to about 5 minutes at between about 250°F. and about 450°F. A preferred bake is for about 10 seconds at 350°F. Because of some end uses, however, this bake may be impractical but can be reduced to, for example, 10 seconds at 275°F. by replacing the water and isopropanol with industrial grade ethyl alcohol.

Suitable substrates are paper, metallic foil and can stock metals (approximately 10 mil stock). The coating can be applied by roll coat, flow coat or gravure coat.

EXAMPLE I

Into a reaction vessel equipped with a heat source, reflux condenser, charging port and an agitator were charged 978 grams citric acid, 60 grams propylene oxide and 16 grams benzyl trimethyl ammonium hydroxide. Agitation was started and the reactants were heated to 175°F. (79.4°C.). While maintaining the temperature of 170°–180°F. (76.7–82.2°C) 546 grams propylene oxide was slowly added being certain that the addition rate was such that no propylene oxide was lost to distillation or incomplete condensation in the reflux condensor. About 3 hours was required for this addition. After the propylene oxide addition was complete, the temperature was raised to 300°F. (148.9°C.) and held (1.5–2.0 hours) until an acid number of 180–190 was obtained. The reaction mixture was then subjected to the distillation under a vacuum of 24–26 inches of mercury for one hour to remove lower molecular weight fragments, maintaining the temperature above 210°F. (98.9°C.). Then, while continuing cooling and agitation, 400 g. water was added. The resultant product was a clear solution of 76–80% solids having a weight per gallon of 10.0–10.5 pounds and a viscosity of 490–500 cps. The final acid number was 180–190.

EXAMPLE II

In a mixing vessel was stirred 564 g. of alkylated melamine resin (Cymel 7273-7), 257 g. deionized water and 123 g. anhydrous isopropanol. Stirring was continued until the components were thoroughly blended and then 7 g. sodium dioctyl sulfosuccinate (Aerosol OT) were added and stirring was continued until it was dissolved. Finally, 49 g. montan wax slurry in water at 30% solids (Jonwax 25) were added and stirring was continued until uniformity was obtained.

EXAMPLE III

There was stirred together 570g. of the product of Example I and 430 g. of the product of Example II. When thoroughly blended, the mixture was allowed to stand overnight before using. The final product had a resin solids of 66% in a water-alcohol mixture, a viscosity of 55–65 seconds No. 2 Zahn Cup at 80°F. and a weight per gallon of 9.75–9.85 pounds.

For use as a paper label varnish this product was thinned 20/1 with isopropanol. It was then applied to a paper label surface at a film weight of 3.0–3.5 mg/sq.in. and baked 10 seconds at 350°F. (176.7°C.). A high gloss thermoset varnish was produced which had good appearance over both paper and inked areas.

In order to eliminate the overnight aging mentioned in Example III a portion of the alkylated melamine-formaldehyde resin is removed from Example II and incorporated into Example I. Also to permit production in equipment having power limitations, a portion of the deionized water can be added first to dissolve citric acid rather than having it present as a dry material during the first part of the resin preparation. These modifications are shown in the following example.

EXAMPLE IV

To a stainless steel reactor equipped with a heating and cooling source, a reflux condenser and a vacuum system there was charged 77 lbs. deionized water. Agitation was commenced and the water was heated at 205°F. (96.1°C.). There were gradually added 429 lbs. of citric acid while maintaining agitation and keeping the temperature at least above 150°F. (65.6°C.). Then, 7 lbs. benzyl trimethyl ammonium hydroxide was added followed by the addition of 266 lbs. propylene oxide over a 4 hour period, allowing the temperature to rise to a maximum of 190°F. (87.8°C.). At completion of the propylene oxide addition the temperature was increased to 300°F. (148.9°C.) and held until an acid number of 180–190 was obtained. Then distillation under a vacuum of 24–26 inches of mercury was carried out for one hour, allowing the temperature to drift to a minimum of 210°F. (98.9°C.). Then, 176 lbs. deionized water and 45 lbs. of alkylated melamine resin (Cymel 7273-7) were added and the contents of the reaction vessel were heated to 250°F. (121.1°C.) and held for one hour. The resulting solution was cooled to 120°F (48.9°C.) and filtered. The final product had a weight per gallon of 10.25 lbs., total solids of 80% and a 70 second No. 2 Zahn Cup viscosity.

EXAMPLE V

The aminoplast component was made according to Example II, except that the weights of the ingredients were 530 g. alkylated melamine resin (Cymel 7273-7), 276 g. deionized water, 132 g. anhydrous propanol, 8 g. sodium dioctyl sulfosuccinate (Aerosol OT) and 53 g. montan wax slurry in water at 30% solids (Jonwax 25).

EXAMPLE VI 60 parts of the product of Example IV was blended with 40 parts of the product of Example V. This yielded a finish ready for immediate use, having properties the same as those of the coating of Example III. This coating was applied to label stock with the results as obtained in Example III using a 10 seconds bake at 350°F. (176.7°C.). The bake was reduced to 10 seconds at 275°F. (135°C.) by replacing the water of Example IV and the water and isopropanol of Example V with industrial grade ethyl alcohol.

EXAMPLE VII

Using the equipment described in Example I, there were charged 827g. of dipropylene glycol and 576g. citric acid. Under agitation, the reaction mixture was heated to 150°C. and held at that temperature until an acid number of 130–135 was attained (theoretical= about 123) and a theoretical water removal of 108g. This required about 4 hours. When the proper acid number was reached, reaction was stopped by adding 155g. water. This produced a water-soluble product of 90% solids that could be blended with an aminoplast and baked, as described hereinbefore to produce a baked finish.

EXAMPLE VIII

Other combinations of hydroxy polycarboxylic acids and alkylene oxides or styrene oxide are reacted substantially as described in Example I in an amount to react in a ratio of hydroxyl equivalents to carboxyl equivalents of 4:3. The combinations and theoretical acid number are set forth in the following Table. The resultant products are blended with an aminoplast and baked, as described hereinbefore, to produce a baked finish.

TABLE

| Acid | Oxide | Theoretical Acid No. |
|---|---|---|
| Malic | Ethylene | 194 |
| Malic | Propylene | 177 |
| Malic | Butylene | 163 |
| Malic | Styrene | 127 |
| Tartaric | Ethylene | 179 |
| Tartaric | Propylene | 165 |
| Tartaric | Butylene | 152 |
| Tartaric | Styrene | 120 |
| $\alpha,\beta$-Dihydroxycarballylic | Ethylene | 190 |
| $\alpha,\beta$-Dihydroxycarballylic | Propylene | 173 |
| $\alpha,\beta$-Dihydroxycarballylic | Butylene | 159 |
| $\alpha,\beta$-Dihydroxycarballylic | Styrene | 125 |
| Citric | Ethylene | 200 |
| Citric | Propylene | 182 |
| Citric | Butylene | 167 |
| Citric | Styrene | 130 |

In the Table, the theoretical acid number is based upon reacting 3 acid equivalents with 4 oxide equivalents. This is the basic combining proportion to produce the polyester products of this invention that are combined with an aminoplast to produce a baking resin, in accordance with this invention. As indicated hereinbefore, the desired degree of polyesterification is achieved by continuing esterification until the acid number is between the theoretical acid number and about 25% above the theoretical acid number for the particular combination of aliphatic hydroxy polycarboxylic acid and alkylene oxide, alkylene glycol, or styrene oxide used. In general, depending on the reactant combination, the acid number will range from the lowest of 120 (tartaric acid-styrene oxide) to 25% above the highest acid number of 200 (citric acid-ethylene oxide) or 250, i.e., a range of about 120–250.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A water-soluble, up to 80 percent of solids, acidic polyester produced by polyesterifying an aliphatic hydroxy polycarboxylic acid selected from the group consisting of citric acid, tartaric acid, malic acid, and $\alpha, \beta$-dihydroxytricarballylic acid with a compound selected from the group consisting of alkylene oxides having from 2 to 4 carbon atoms, alkylene glycols having from 2 to 6 carbon atoms, and styrene oxide, using a ratio of hydroxyl equivalents to carboxyl equivalents of 5:3 to 2:3, until the acid number is 120–250 depending on the reactant combination.

2. The acidic polyester of claim 1, wherein the polyesterification is carried out in the presence of an alkaline catalyst.

3. The acidic polyester of claim 2, wherein said hydroxy polycarboxylic acid is citric acid, said alkylene oxide is propylene oxide, and said acid number is about 180–225.

4. The acidic polyester of claim 3, wherein said acid number is about 180–190.

5. The acidic polyester of claim 2, wherein said hydroxy polycarboxylic acid is citric acid and said alkylene glycol is dipropylene glycol.

6. The acidic polyester of claim 5, wherein said acid number is about 130–135.

\* \* \* \* \*